(12) United States Patent
Joo et al.

(10) Patent No.: US 9,471,197 B2
(45) Date of Patent: Oct. 18, 2016

(54) CATEGORY SEARCH METHOD AND MOBILE DEVICE ADAPTED THERETO

(71) Applicant: Samsung Electronics Co. Ltd., Suwon-si, Gyeonggi-do (KR)

(72) Inventors: Hanjo Joo, Suwon-si (KR); Jaesam Myung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 13/684,302

(22) Filed: Nov. 23, 2012

(65) Prior Publication Data

US 2013/0167082 A1 Jun. 27, 2013

(30) Foreign Application Priority Data

Dec. 21, 2011 (KR) ........................ 10-2011-0138772

(51) Int. Cl.
| | | |
|---|---|---|
| *G06F 3/048* | (2013.01) | |
| *G06F 3/0482* | (2013.01) | |
| *G06F 3/0488* | (2013.01) | |
| G06F 3/0481 | (2013.01) | |
| H04N 5/445 | (2011.01) | |

(52) U.S. Cl.
CPC ........... *G06F 3/0482* (2013.01); *G06F 3/0488* (2013.01); *G06F 3/0481* (2013.01); *H04N 5/44543* (2013.01)

(58) Field of Classification Search
CPC . G06F 3/0482; G06F 3/0488; G06F 3/04842
USPC ........................................................ 715/810
See application file for complete search history.

(56) References Cited

U.S. PATENT DOCUMENTS

| | | | |
|---|---|---|---|
| 8,533,175 B2* | 9/2013 | Roswell ........................ 707/710 |
| 8,687,023 B2* | 4/2014 | Markiewicz et al. ........ 345/684 |
| 2005/0210410 A1* | 9/2005 | Ohwa et al. .................. 715/821 |
| 2007/0061748 A1* | 3/2007 | Hirose .......................... 715/764 |
| 2007/0089065 A1* | 4/2007 | Lane et al. .................... 715/764 |
| 2007/0277124 A1* | 11/2007 | Shin et al. .................... 715/863 |
| 2009/0204584 A1* | 8/2009 | Harada ................ G06F 3/0488 |
| 2009/0249203 A1* | 10/2009 | Tsuruta et al. ................ 715/702 |
| 2009/0327963 A1 | 12/2009 | Mouilleseaux et al. |
| 2010/0026640 A1* | 2/2010 | Kim et al. .................... 345/173 |
| 2010/0077355 A1* | 3/2010 | Belinsky et al. ............. 715/835 |
| 2010/0095207 A1 | 4/2010 | Bonnat |
| 2011/0096087 A1* | 4/2011 | Chun ............................ 345/592 |
| 2013/0198690 A1* | 8/2013 | Barsoum ................ G06F 3/017 715/822 |

* cited by examiner

*Primary Examiner* — Ajay Bhatia
*Assistant Examiner* — Jian Yu
(74) *Attorney, Agent, or Firm* — Jefferson IP Law, LLP (57) ABSTRACT

A category search method and a mobile device adapted thereto are provided. The mobile device includes a display unit for displaying screens according to a search function, and a controller. The controller controls the display unit to output a first search bar of higher category items, according to a first touch event that occurs on a certain area of the display unit, and a second search bar including lower category items of an item on the first search bar where a second touch event occurs.

17 Claims, 6 Drawing Sheets

CATEGORY SEARCH METHOD AND MOBILE DEVICE ADAPTED THERETO

PRIORITY

This application claims the benefit under 35 U.S.C. §119 (a) of a Korean patent application filed on Dec. 21, 2011 in the Korean Intellectual Property Office and assigned Serial No. 10-2011-0138772, the entire disclosure of which is hereby incorporated by reference.

BACKGROUND OF THE INVENTION

1. Field of the Invention

The present invention relates to a method for rapidly searching for lower categories, and a mobile device adapted thereto.

2. Description of the Related Art

Mobile devices have been widely used because they can support a number of user functions and be easily carried. They have been developed to provide integrated user functions, for example, a TV viewing function, a content searching function, a web access function, a photograph searching function, and the like. To support these functions, mobile devices of the related art include display units of a certain size and display a variety of screens thereon according to the operations.

In recent years, mobile devices have been developed to employ a larger screen. More particularly, the display units are implemented with touch screens, or full touch screens, serving as input devices. Mobile devices with full touch screens can provide a large amount of information and a number of menus. Although mobile devices of the related art provide a large amount of information and a number of menus via the full touch screens, they can be controlled by applying only touches thereto, and this makes it difficult for users to search for a specific menu or corresponding information. More particularly, if a search is made for information categories or menus of a number of depths, one category is identified and the lower categories are searched, and this is repeatedly performed for all the categories. Therefore, if users need to select a specific lower category, they need to repeat the touch actions until they find the category, which causes user inconvenience. In addition, during the process of searching for an item, mobile devices of the related art wait for a certain period of time to switch screens according to the repeated item selection, which causes user inconvenience.

Therefore, a need exists for a method for rapidly searching for categories with a number of depths and a mobile device adapted thereto.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method for rapidly searching for categories with a number of depths and a mobile device adapted thereto.

In accordance with an aspect of the present invention, a category searching method is provided. The method includes outputting a first search bar of higher category items, according to a first touch event that occurs on a certain area of a display unit, and outputting, if a second touch event occurs at a certain position on the first search bar, a second search bar including lower category items of an item where the second touch event occurred.

In accordance with another aspect of the present invention, a mobile device with a category search function is provided. The mobile device includes a display unit for displaying screens according to a search function, and a controller. The controller controls the display unit to output a first search bar of higher category items, according to a first touch event that occurs on a certain area of the display unit, and a second search bar including lower category items of an item on the first search bar where a second touch event occurs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Detailed descriptions of well-known functions and structures incorporated herein may be omitted to avoid obscuring the subject matter of the invention. A detailed description of configurations that includes the same elements and performs the same functions will not be explained repeatedly in the description.

Although the drawings represent exemplary embodiments of the present invention, the drawings are not necessarily to scale and certain features may be exaggerated or omitted in order to better illustrate and explain the invention. It should be understood that exemplary embodiments of the present invention are not limited to the drawing scale.

FIGS. 1 through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
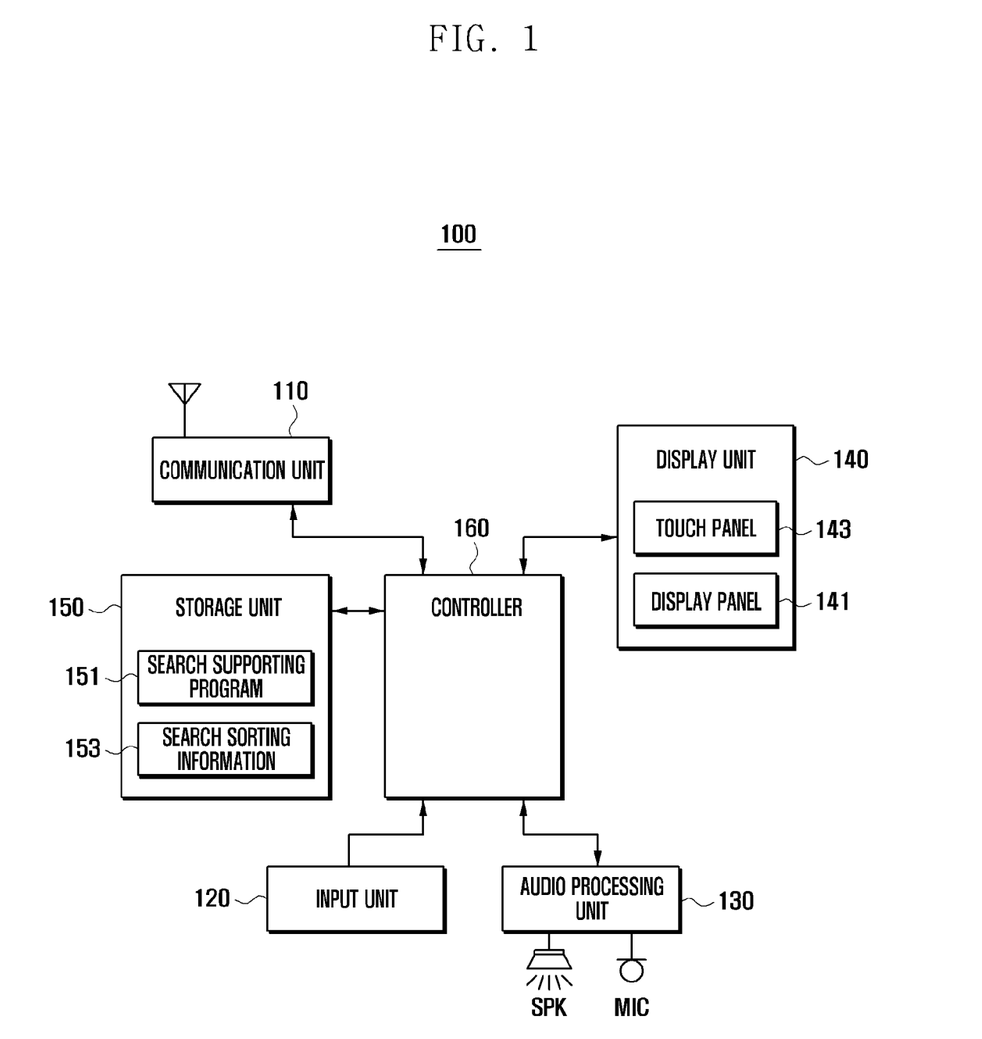
FIG. 1 illustrates a block diagram of a mobile device that supports a category search function according to an exemplary embodiment of the present invention.

FIG. 1 illustrates a block diagram of a mobile device that supports a category search function according to an exemplary embodiment of the present invention.

Referring to FIG. 1, a mobile device 100 includes a communication unit 110, an input unit 120, an audio processing unit 130, a display unit 140, a storage unit 150, and a controller 160.

When executing a function for searching for index information with a number of depths, such as menus, phone numbers, names, items, and the like, the mobile device 100 allows the user to search for a corresponding item via one touch, i.e., one touch gesture or one touch drag gesture. The mobile device 100 supports a rapid menu search which allows the user to rapidly search for a corresponding item with ease. When a search is made for categories, stored where specific items are linked to each other, and for information sorted according to indexes, the mobile device 100 allows the user to rapidly search for corresponding information with ease via a touch event. Examples of the touch event may include a touch down event, a touch and drag event, and a touch and direction altering event.

The communication unit 110 supports communication of the mobile device 100. If the mobile device 100 is implemented in such a way that it does not support a communication function, it may not be equipped with the communication unit 110. The communication unit 110 may be implemented with a module for supporting communication, more particularly, mobile communication. The communication unit 110 establishes communication channels with a mobile communication system and transmits/receives signals thereto/therefrom. For example, the communication unit 110 establishes at least one of the voice, video, and data service channels with a mobile communication system, and transmits/receives corresponding signals via the channels.

The mobile device 100 provides information regarding a phone book via the communication unit 110. The phone book refers to information regarding a number of users who have been registered. The phone book information allows for a search with a number of depths. If the user needs to operate the communication unit 110, he/she can execute a phone book search function. During the process, in order to support a category search function, the mobile device 100 collects indexes included in the phone book and sorts them. The communication unit 110 supports a function for accessing a web site or an information providing site, and outputs information, downloaded from the site, to the display unit 140. The information regarding the site, received via the communication unit 110, may support a category search function according to the user's selection or by default set to the mobile device.

The input unit 120 generates signals required for the operations of the mobile device 100. The input unit 120 may be implemented with a keyboard, a keypad, key buttons, and the like, according to the compatibility with the mobile device. If the display unit 140 is implemented with a touch screen, the input unit 120 may be a touch map displayed thereon. The input unit 120 may support a touch screen in order to support a category search function. The input unit 120 generates a variety of input signals according to the user's request, for example, signals for setting or releasing a category search function mode, a signal for calling the highest category screen for information or a menu with a number of depths, a signal for, if an item is selected and activated, operating the selection and activation of the item, a signal for terminating the activated item function, and the like. The input unit 120 transfers the generated input signals to the controller 160, and the controller 160 executes corresponding functions. The input signals may be generated via touch events that occur on a touch panel 143 of the display unit 140.

The audio processing unit 130 outputs audio signals that are set during the operations of the mobile device 100, generated when audio files stored in the storage unit 150 are played back, or received from the outside. The audio processing unit 130 supports an audio signal collecting function. To this end, the audio processing unit 130 includes a speaker (SPK) and a microphone (MIC). In an exemplary embodiment of the present invention, when a category search function has been executed and a user function, e.g., a phone book function, to which the category search function will be applied, is activated, the audio processing unit 130 outputs a sound for informing the user of the set category search function. The audio processing unit 130 can also output a sound effect according to the touches on a screen to which the category search function is applied.

The display unit 140 provides a variety of screen interfaces required for the operations of the mobile device 100. For example, the display unit 140 supports an idle screen, menu screens, and the like. In an exemplary embodiment of the present invention, the display unit 140 provides a screen interface to support a category search function, which will be described with reference to FIGS. 3 through 5.

The display unit 140 may be implemented with a touch screen. In that case, the touch screen includes a display panel 141 and the touch panel 143, where the touch panel 143 is installed to the front of the display panel 141. The display panel 141 displays images, texts, a search bar, and the like, corresponding to the variety of screens described above. The touch panel 143 includes a touch effective area and a non-touch effective area, defined according to the features of the screens displayed on the display panel 141, and transfers a signal corresponding to a touch event that occurs on the touch effective area to the controller 160.

The touch panel 143 may support the setting of a touch effective area for the search bar on the display panel 141. The screen interface supporting the category search function may allow the search bar to be output, step by step, according to categories. If a search bar for supporting a new lower category is displayed on the display panel 141, the touch panel 143 can set the area of the search bar as a touch effective area. In addition, the touch panel 143 defines an area of a higher category linked to the newly output search bar as a non-touch effective area. Alternatively, the touch panel 143 may define only an area of the higher category immediately before the newly output search bar as a touch effective area and the areas of the remaining higher categories as a non-touch effective area. The touch effective area and non-touch effective area may be adaptively altered according to the creation or deletion of the search bar.

The storage unit 150 stores an Operating System (OS), application programs implementing a variety of algorithms, and the like, required for the operations of the mobile device 100. In an exemplary embodiment of the present invention, the storage unit 150 stores a search supporting program 151 and search sorting information 153.

The search supporting program 151 supports a category search function. If the mobile device 100 executes a user function for searching for information (e.g., phone book, schedule, calendar, content, and the like) or menu, made up of categories with a number of depths, the search supporting program 151 may be loaded on the controller 160 according to the settings. In order to execute a user function for supporting a search function, the search supporting program 151 includes a number of routines, for example, for determining whether the user function supports a category search function, for identifying, if the user function supports a category search function, whether the database of the selected user function includes search sorting information 153 for supporting the category search function, and for performing a search process based on the identified search sorting information 153. In addition, in order to support a case where the database of the selected user function does not include search sorting information 153, the search supporting program 151 may further include a routine for generating search sorting information 153 for supporting the category search function of the user function, according to the user's request or settings, or the manufacturers' settings, and a routine for storing the generated search sorting information 153. Using the routines described above, the search supporting program 151 can adaptively support the category search function during the execution of a user function. The search supporting program 151 can update the search sorting information 153 in order to support the category search function.

The search sorting information 153 is generated according the execution of the search supporting program 151 and used to support the category search function. The search sorting information 153 refers to information that sorts the indexes of lower category items linked to the higher category items, with a number of depths. If a user function for supporting an information search operation is not configured to support a category search function, the search sorting information 153 may be newly created by the controller 160. If items are altered according to the addition, deletion, or correction of information regarding a corresponding user function, the alteration is applied to the search sorting information 153, thereby updating it.

The controller 160 controls the flow of signals, the information collection, and the output operation, in order to support a category search function. The controller 160 performs control operations to support the category search function and manages the search sorting information 153. Although information is not sorted in a format to support a category search function in the mobile device 100, the controller 160 identifies the arrangement of the indexes regarding corresponding information, classifies the indexes according to categories with a successive depth, and rearranges the information in the format to support the category search function, thereby creating search sorting information 153. The controller 160 stores and manages the search sorting information 153. In order to search for corresponding information, the controller 160 supports the category search function as an additional function or a primary search function. To this end, the controller 160 includes the components as shown in FIG. 2.

Figure 2:
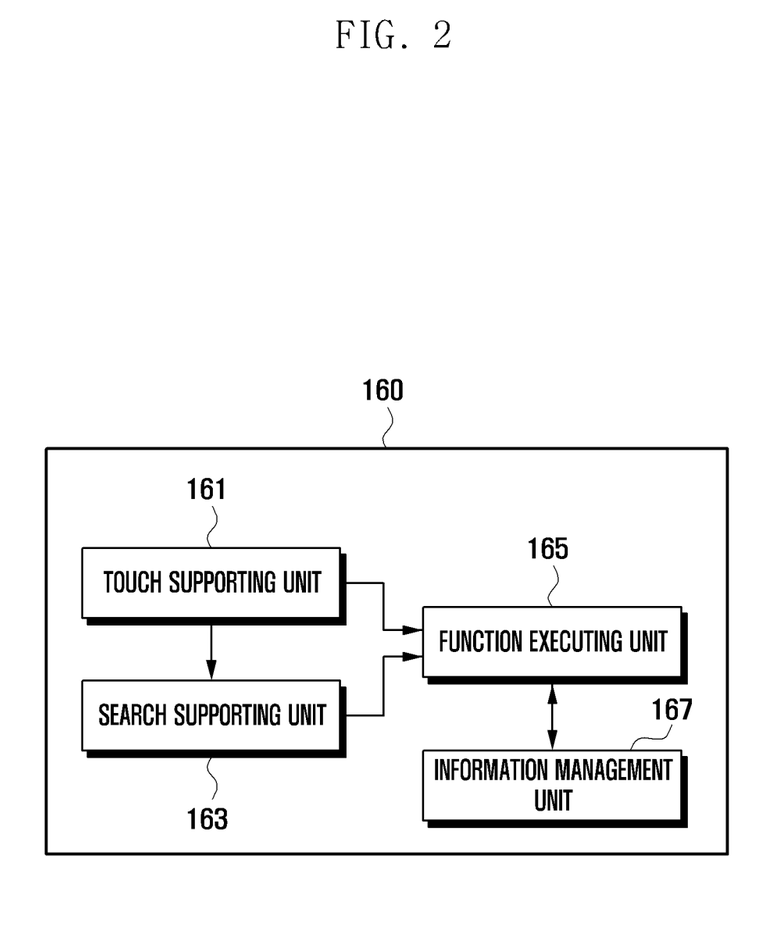
FIG. 2 illustrates a block diagram of a controller according to an exemplary embodiment of the present invention.

FIG. 2 illustrates a block diagram of a controller according to an exemplary embodiment of the present invention.

Referring to FIG. 2, the controller 160 includes a touch supporting unit 161, a search supporting unit 163, a function executing unit 165, and an information management unit 167.

The touch supporting unit 161 receives a signal corresponding to a touch event that occurs at a location on the touch panel 143 and provides it to the search supporting unit 163 and the function executing unit 165. If the touch supporting unit 161 receives a signal corresponding to a touch event that occurs in an area of a search bar for supporting a category search function on the touch panel 143, it transfers the signal to the search supporting unit 163. On the contrary, if the touch supporting unit 161 receives a signal corresponding to a touch event that occurs in an area other than the search bar area on the touch panel 143, it transfers the signal to the function executing unit 165. If the touch supporting unit 161 receives signals corresponding to touch events for supporting a category search function, it transfers the signals to the search supporting unit 163.

The search supporting unit 163 receives a signal corresponding to a touch event from the touch supporting unit 161 or an input signal from the input unit 120, corresponding to a category search function, and performs operations to support the category search function. For example, if a user function is activated, the search supporting unit 163 determines whether the user function needs a category search function. If the search supporting unit 163 ascertains that the user function needs a category search function, it determines whether a category search function is set to the user function. If the search supporting unit 163 ascertains that a category search function is set to the user function, it determines whether search sorting information 153 for supporting a category search function of the user function exists. If the search supporting unit 163 ascertains that search sorting information 153 exists, it displays an area of a search bar on the display panel 141 and sets the search bar area as a touch effective area of the touch panel 141, based on the search sorting information 153.

The search supporting unit 163 performs an output control operation so that a search bar for searching for a new lower category is linked to a search bar for searching for the previous higher category, according to a signal corresponding to a touch event from the touch supporting unit 161. If a touch down event occurs on a specific location, the search supporting unit 163 supports a control operation to output a search bar including the highest category items. If a direction altering touch, e.g., a right-angled touch drag, occurs on a specific item of a corresponding search bar on the touch panel 143 in a direction perpendicular to the direction to which the search bar is displayed, the search supporting unit 163 supports a control operation to output a search bar including the lower category items. In that case, the search supporting unit 163 supports a control operation to output a search bar of the lower category items that corresponds to a higher category item at the location where the right-angled touch drag is generated.

If a touch event for selecting a specific category item occurs, the search supporting unit 163 transfers the selection information regarding the item to the function executing unit 165. For example, if a touch selects a specific category item and releases therefrom in a state where a search bar, including category items by a touch drag, is output, the search supporting unit 163 transfers the selection information regarding corresponding category items to the function executing unit 165.

If a specific touch event occurs according to a user's request, the search supporting unit 163 may remove the output search bars from the display unit 140 once. For example, in a state where a search bar corresponding to at least one depth is output and a touch down gesture is maintained on the search bar, if a flick event occurs in a certain direction or a specific direction or a specific gesture event occurs, the search supporting unit 163 may remove search bars for supporting a function for searching for corresponding categories.

If a specific touch event occurs, the search supporting unit 163 may remove only a search bar including newly output lower category items from the display unit 140. For example, in a state where a touch is applied to one of the higher category items, if a right-angled touch drag event occurs, the search supporting unit 163 supports a control operation to output a search bar including the lower category items corresponding to a corresponding specific item. During the process, if the user successively generates a drag in a direction opposite to that of the right-angled touch drag or a specific type of gesture drag, the search supporting unit 163 may remove a search bar including the output lower category items from the display unit 140.

If search sorting information 153 does not exist, the search supporting unit 163 collects indexes regarding information related to a corresponding user function. The search supporting unit 163 rearranges the collected indexes to form search sorting information 153 according to a preset rule. For example, the search supporting unit 163 sorts the first letters of the information names to the higher category, and then the letters following the first letters in information names to the lower category, thereby generating search sorting information 153 for the category search function. Alternatively, the search supporting unit 163 identifies information sorted as higher categories and information sorted as lower categories, and links them to each other in a format so that they can be applied to a category search function.

The information management unit 167 manages the search sorting information 153 stored in the storage unit 150. If an item in the search sorting information 153 is deleted or the index name is altered when a user function is executed, the information management unit 167 corrects indexes in the search sorting information 153. Alternatively, if an item is added to the category, the information management unit 167 collects the index of the added item and applies it to the search sorting information 153, so that the indexes of pieces of information can be rearranged in the search sorting information 153.

The function executing unit 165 executes user functions according to signals corresponding to touch events from the touch supporting unit 161. More particularly, if the function executing unit 165 receives the selection information of a specific category item from the search supporting unit 163, it performs a control operation to display information corresponding to the selected category item or to execute the user function. For example, if the category item is a phone book, the function executing unit 165 supports a control operation to output a screen for displaying the details of a corresponding item on the display unit 140. If an item in a specific category is deleted or corrected or an item is added to the category during the execution of the user function, the function executing unit 165 transfers the alteration to the information management unit 167.

Figure 3:
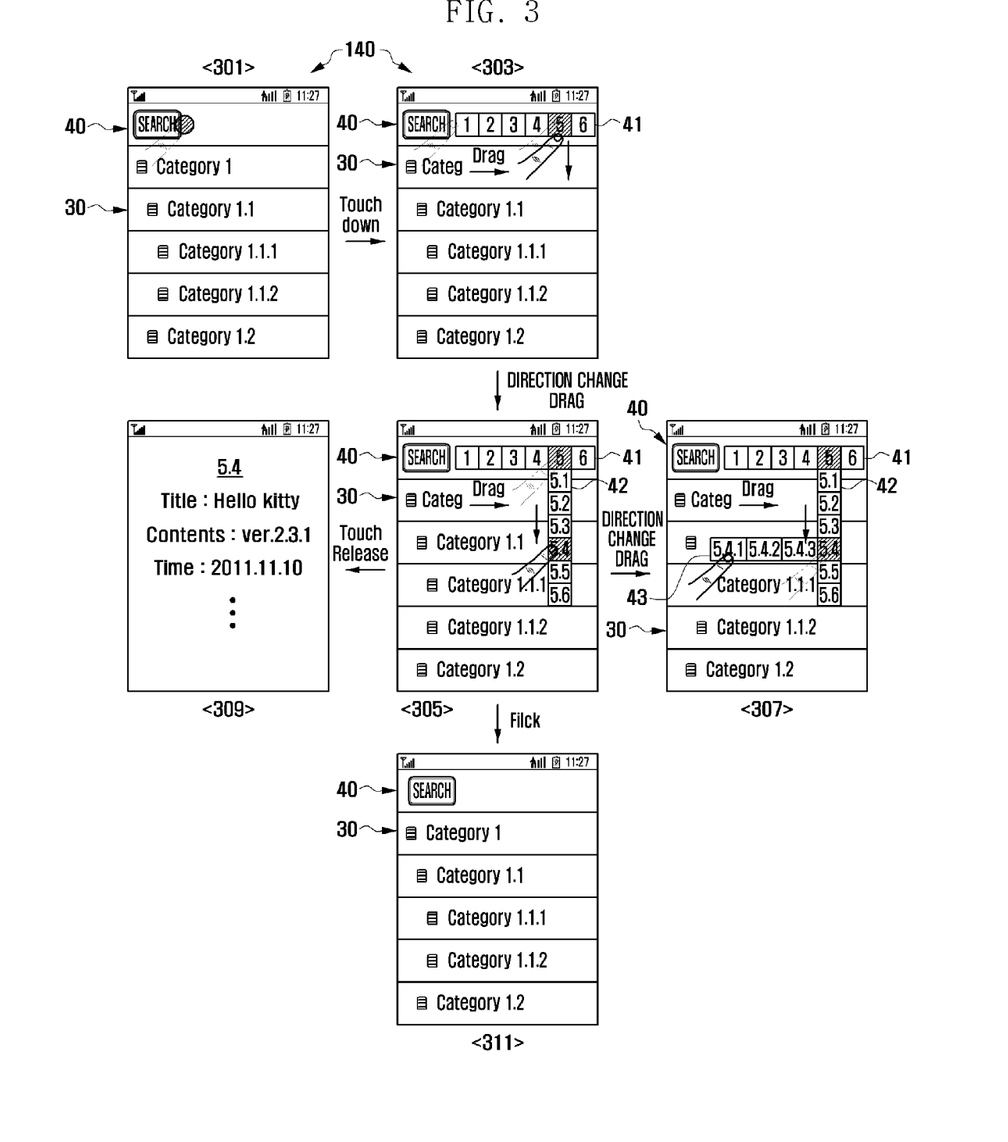
FIG. 3 illustrates screen interfaces that describe a category search function according to an exemplary embodiment of the present invention.

FIG. 3 illustrates screen interfaces that describe a category search function according to an exemplary embodiment of the present invention.

Referring to FIG. 3, if a user selects one of the user functions that supports a search function in a mobile device 100, the controller 160 controls the display unit 140 to display a screen interface for supporting the selected user function on the screen as shown in diagram 301. The screen of the display unit 140 includes an information area 30 for displaying a variety of items and a search area 40 for searching for items displayed on the information area 30. The search area 40 calls a search bar for executing a category search function. More particularly, the search area 40 may call a search bar including the highest category items. It should be understood that the search area 40 is not fixed, but instead may be a preset area or an area in the display unit 140. For example, if the user generates a touch down event at a certain position on a screen executing a search function, the position may be defined as the search area 40. Therefore, the search area 40 displays a search bar including the higher category items.

As shown in diagram 301, the user generates a touch event, e.g., a touch down event, on the search area 40. In that case, as shown in diagram 303, the controller 160 controls the display unit 140 to display a first search bar 41 including the highest category items. Although the exemplary embodiment of the present invention is implemented in such a way that the first search bar 41 is displayed widthwise, it should be understood that the first search bar 41 may be aligned in other directions according to the user's selection or the manufacturers' settings. The user may generate a touch event for indicating the highest category item of an item that he/she will search for on the first search bar 41, e.g., a touch drag gesture on an item to be indicated in a state where the first touch down event is maintained. For example, it is assumed that the user generated a touch drag event for indicating 'Item 5' on the first search bar 41. In that case, the user may generate a touch event for searching for a lower category item of the indicated higher category item. For example, the user may generate a touch drag in a direction perpendicular to the aligned direction of the first search bar 41 on 'Item 5.'

In that case, the controller 160 detects that a right-angled touch drag event occurred on the first search bar 41, and controls the display unit 140 to display a second search bar 42 for searching for a lower category item corresponding to a corresponding item as shown in diagram 305. Similarly, if the user generates a right-angled touch drag event on a specific item on the second search bar 42, the controller 160 controls the display unit 140 to display a third search bar 43 as shown in diagram 307.

As described above, the mobile device 100 successively outputs search bars including lower category items, according to touch drag events repeatedly performed after a touch down gesture, so that the user can simply and easily search for a specific lower item.

If the user generates a first touch event that has been set, e.g., a touch release event, on the screen as shown in diagram 305, the controller 160 selects an item at the position where the touch release event occurred and executes a user function corresponding to the selected item as shown in diagram 309. If the user generates a second touch event that has set, e.g., a flick event, on the screen as shown in diagram 305, the controller 160 removes all the search bars displayed the screen and returns to the initial search screen as shown in diagram 311. Similar to the screen shown in diagram 309 where an item selection function is executed and the screen shown in diagram 311 where a current screen is returned to the initial search screen, the processes can be generated in the same way on the screen shown in diagram 307. For example, if a touch release event occurs on the screen as shown in diagram 307, in a state 'Item 5.4.1' has been indicated, the controller 160 executes a function corresponding to the 'Item 5.4.1.' Similarly, if a flick event occurs on the screen as shown in diagram 307, in a state 'Item 5.4.1' has been indicated, the controller 160 returns the screen to the initial search screen as shown in diagram 311.

As described above, if the mobile device 100 detects a two-dimensional pattern, i.e., a touch event where the direction is altered to a certain angle, it continues to perform a searching operation or controls a search function, according to the detected pattern.

Figure 4:
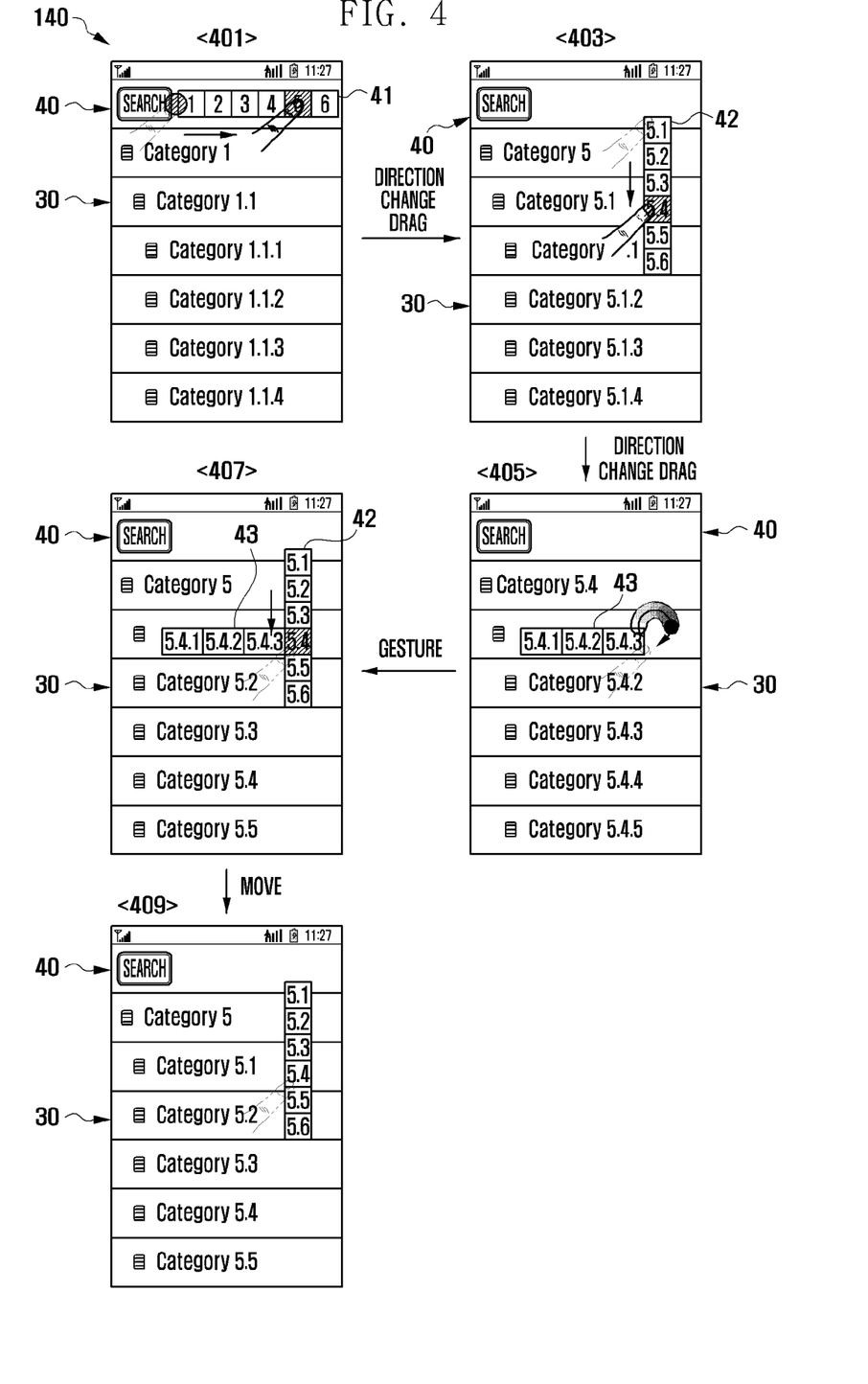
FIG. 4 illustrates screen interfaces that describe a category search function according to an exemplary embodiment of the present invention.

FIG. 4 illustrates screen interfaces that describe a category search function according to an exemplary embodiment of the present invention.

Referring to FIG. 4, a user operates the mobile device 100 to execute a user function for supporting a category search function.

When the user function is executed, the user generates a preset touch event, e.g., a touch down event, on a search area 40. In that case, the mobile device 100 displays a first search bar 41 including higher category items on the display unit 140 as shown in diagram 401.

When the user selects one of the higher category items in the first search bar 41, a second search bar 42 including lower category items of the selected higher category item is displayed on the display unit 140. To this end, the user selects one of items in the first search bar 41, e.g., Item 5, and generates a preset event on the selected item 'Item 5' on the touch panel 143. An example of the preset event may be a drag event that the touch is dragged in a certain angle from the selected item. In that case, the mobile device 100 displays the second search bar 42 on the display unit 140, and removes the first search bar 41 therefrom, as shown in diagram 403.

If the user selects one of the lower category items, e.g., '5.4,' on the second search bar 42, and makes a gesture to display a third search bar 43, the mobile device 100 displays the third search bar 43 including lower category items of the selected item '5.4' on the display unit 140 as shown in diagram 405. In that case, the mobile device 100 displays the third search bar 43 on the display unit 140, and removes the second search bar 42 therefrom, as shown in diagram 405.

Meanwhile, the user may cancel the third search bar 43 including lower category items of the item '5.4' and return to the second search bar 42. To this end, the user may generate a preset gesture event, e.g., a circle drawing gesture event, on the third search bar 43 as shown in diagram 405. In that case, the mobile device 100 re-displays the second search bar 42 on the display unit 140 as shown in diagram 407. Thereafter, if the touch drag gesture moves to the second search bar 42 or a preset period of time has elapsed, the mobile device 100 removes the third search bar 43 from the display unit 140 as shown in diagram 409.

Although the exemplary embodiment of the present invention is implemented in such a way that a search bar including higher category items or lower category items of a selected item is removed when a new search bar is displayed, it should be understood that the present invention is not limited to the exemplary embodiments. For example, it may be modified in such a way that the two search bars (i.e., old and new) are displayed on the display unit 140 and the other search bars are removed therefrom. For example, the mobile device 100 may display, on the display unit 140, a search bar including higher category items of a selected item and a search bar including current lower category items related thereto. Alternatively, the mobile device 100 may display, on the display unit 140, a search bar including lower category items of a selected item and a search bar including current higher category items related thereto.

If a new search bar is displayed on the display unit 140, the controller 160 displays details of the items included in the search bar on the display panel 141. For example, the mobile device 100 links items included in a list screen located under the search bar to those included in the search bar.

Figure 5:
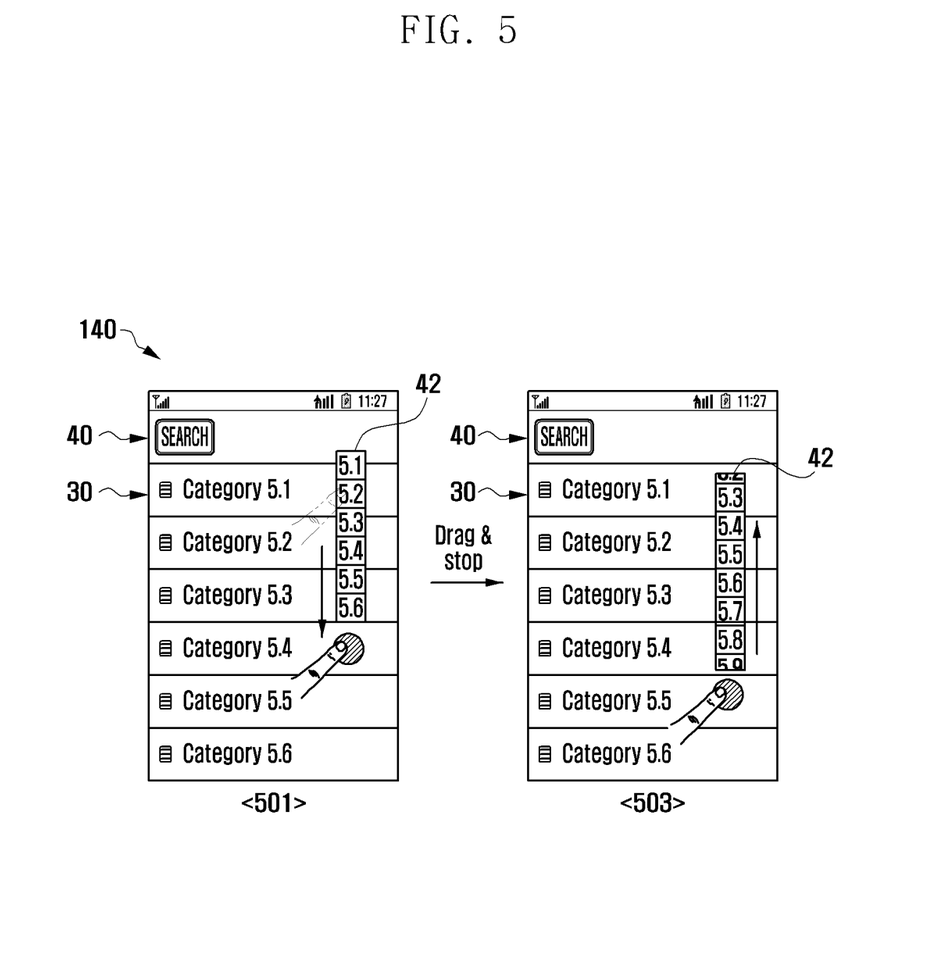
FIG. 5 illustrates screen interfaces that describe an additional function of a category search function according to an exemplary embodiment of the present invention.

FIG. 5 illustrates screen interfaces that describe an additional function of a category search function according to an exemplary embodiment of the present invention.

Referring to FIG. 5, as shown in diagram 501, the mobile device 100 display a second search bar 42 including lower category items of a specific search bar, e.g., Item 5. To this end, the user makes gestures in order to display the second search bar 42. For example, the user generates a touch down event on the search area 40 to display the first search bar 41. Thereafter, the user generates a touch drag event on the first search bar 41 to select Item 5, and a drag event for altering the gesture direction to an angle, e.g., to a direction perpendicular to the original gesture direction, on Item 5. In that case, the mobile device 100 keeps outputting the second search bar 42 as shown in diagram 501.

The user may search the lower category items of Item 5 via a touch drag while the second search bar 42 is being displayed. If the second search bar 42 does not display all the lower category items of Item 5 on the entire screen once because the number of lower category items to be displayed exceeds the area of the second search bar 42, the user may make an additional touch gesture to search the remaining lower category items. For example, as shown in diagram 503, the user makes a touch drag gesture on the second search bar 42, drags the touch out of the area of the second search bar 42, and keeps the touch down at the position. In that case, the mobile device 100 detects the touch event that has occurred out of the second search bar 42 as an event to execute a scroll function. Simultaneously, the mobile device 100 may replace the lower category items of Item 5, displayed on the second search bar 42, with other items, and display them.

As described above, after displaying a first search bar for searching the first higher category items according to a touch down gesture, the mobile device 100 can detect the presence of a successive touch drag event without releasing the touch, and can identify, if it alters the direction, it as a signal for calling a new search bar. Therefore, the mobile device 100 can allow users to simply and successively search for items related to each other.

As described above, the first 41 and second 42 search bars each include images and/or texts, representing category items, in a form. In an exemplary embodiment of the present invention, although the form is shaped as a rectangle, it should be understood that it may be a polygon, an ellipse, a circle, or a combination thereof. In addition, the form where images and/or texts are listed may be an area associated with the category item.

First and second touch events occur in the mobile device 100 to call the first 41 and second 42 search bars, respectively. The first touch event may be a touch down event corresponding to a state where a touch is kept on the touch panel without losing the contact. The second touch event may occur successively in a state where the first touch event has occurred. Inputting the first touch event may be kept from a time point that the first touch event occurs to a time point that the second touch event is terminated.

The second touch event may be a touch event that occurs at a time point that the drag gesture of the first touch event is terminated. The second touch event may be a touch event that has occurred from a time point that the drag gesture of the first touch event exceeds over a preset angle to a time point that the touch is released, where, during the interval, the touch gesture is not altered. Alternatively, the second touch event may be a touch event that has occurred from a time point that the drag gesture of the first touch event exceeds over a preset angle to a time point that the touch is released, where, during the interval, the touch gesture alters the movement over the preset angle and/or a specific type of gesture is generated. Examples of the specific type of gesture are drag gestures with at least one of a turning point, a curve, a straight line, and the like, e.g., drag gestures for drawing a triangle, a rectangle, a circle, a heart shape, a spiral shape, and the like.

Figure 6:
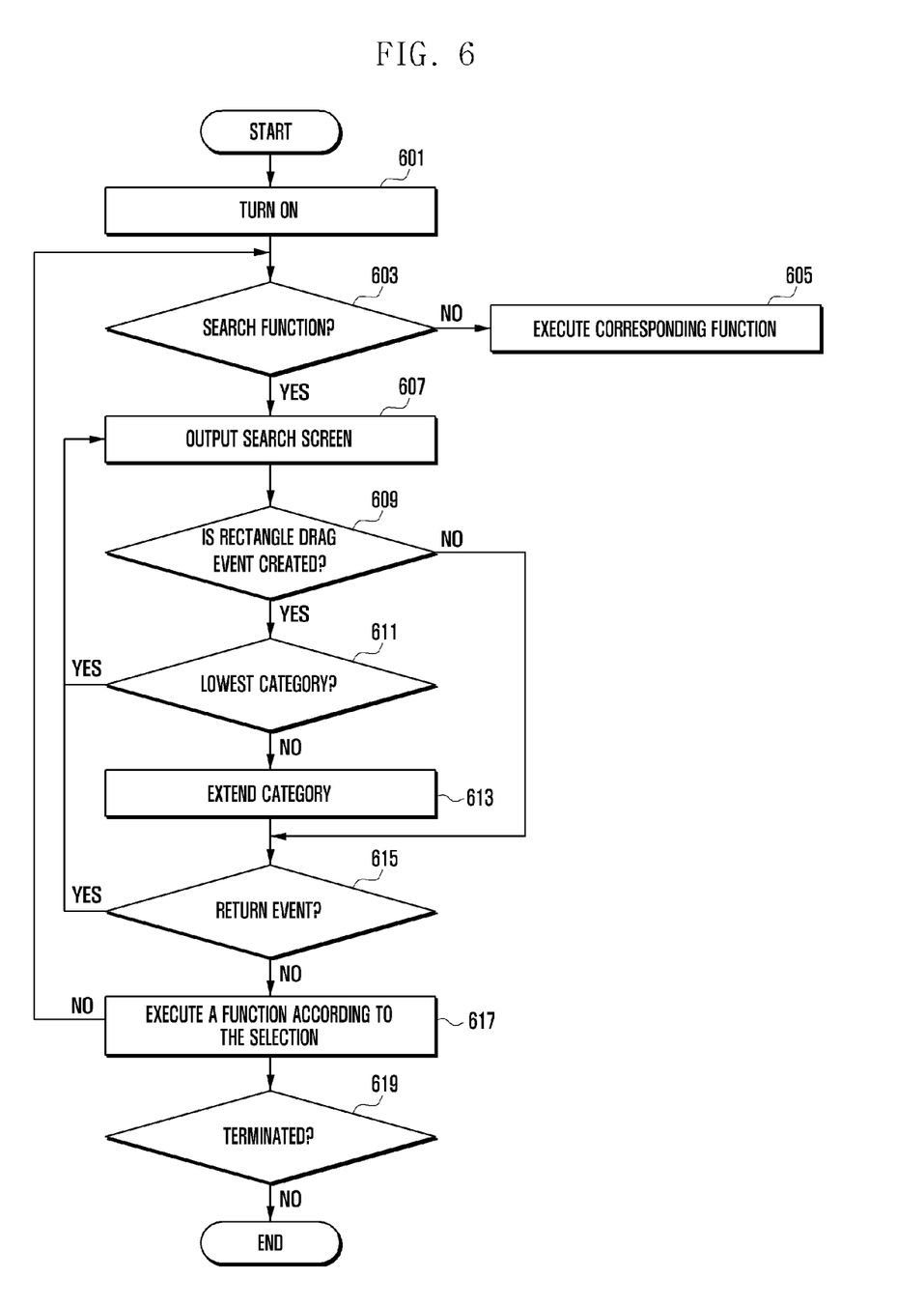
FIG. 6 illustrates a flowchart that describes a category search method according to an exemplary embodiment of the present invention.

FIG. 6 illustrates a flowchart that describes a category search method according to an exemplary embodiment of the present invention.

Referring to FIG. 6, when the mobile device 100 is turned on at step 601, the controller 160 supplies the components with electric power.

The controller 160 determines whether an input signal is created to execute a category search function at step 603. If the controller 160 ascertains that an input signal is created or a touch event occurs to execute a category search function at step 603, it identifies whether the input signal or touch event is a signal or event to execute a user function, registered as search sorting information 153. If the controller 160 ascertains that the input signal or the touch event is not related to a category search function at step 603, it executes a function corresponding to the input signal or the touch event at step 605. Examples of the corresponding function are a broadcast viewing function, a file playback function, a video acquiring function, a call service function, and the like, according to the types of mobile devices.

If the controller 160 ascertains that an input signal is created or a touch event occurs to execute a category search function at step 603, it controls the display unit 140 to display a search screen at step 607. The search screen refers to a screen for supporting the search function and includes the search area 40 and the information area 30 or only the search area 40. Examples of the category are a variety of items that can be sorted to higher or lower levels according to indexes or contents, e.g., menus, phone numbers, names, articles, dates, commodities, and the like.

If a touch event occurs on the search area 40, the controller 160 outputs a search bar for searing for the higher category items according to the presence of the event. An example of the touch event may be a touch down event that occurs on an icon or area in the search area 40.

Thereafter, the controller 160 determines whether a right-angled drag event occurs on a corresponding search bar at step 609. The user can select an item on the search bar in a state where a touch down event is kept to use the category search function, and make a touch gesture for outputting a search bar including lower category items of a corresponding item, i.e., a drag gesture in a direction perpendicular to the touch down point. If the controller 160 ascertains that a right-angled drag event has occurred on a corresponding search bar at step 609, it determines whether the current category is the lowest category at step 611. If the controller 160 ascertains that the current category is the lowest category at step 611, it outputs a guide sound or a guide message indicating that a right-angled touch drag event has occurred, or that there is no lower category item, and returns to the previous search screen or the initial search screen.

If the controller 160 ascertains that the current category is not the lowest category at step 611, it supports the extension of the category at step 613. For example, the controller 160 collects information regarding the lower category items corresponding to the higher item selected by the right-angled drag event, and supports the output of an additional search bar to search for lower category items, based on the collected information.

Thereafter, the controller 160 determines whether a return event occurs at step 615. If the controller 160 ascertains that a return event occurred at step 615, it returns to step 607 and outputs the initial search screen. The return event refers to an event that removes a search bar that has been displayed and requests for the return to the initial search screen. The return event may be an event corresponding to a particular type of gesture or a flick event where a gesture moves in a certain direction in a state where a touch down is kept.

On the contrary, if a return event does not occur at step 615, i.e., if an event occurs to select a specific category item, the controller 160 executes the category item selection function according to the event at step 617. The item selecting event may be a touch release event on the search bar where items are arrayed. Therefore, when the user generates a right-angled drag event, search bars for searching for lower category items of a higher category item are successively output. If the user needs to select one of the lower category items, he/she can release the successive touch drag event. Therefore, the user can rapidly search for a corresponding item with ease via gestures, i.e., from a touch down gesture to the touch releasing gesture.

Thereafter, the controller 160 determines whether a signal for terminating the procedure is input at step 619. If the controller ascertains that a signal for terminating the procedure is not input at step 619, it returns to step 603.

Although the exemplary embodiment of the present invention is implemented in such a way that the touch event for outputting a search bar for searing for lower category items is generated by a drag gesture that moves in a direction perpendicular to the touch, it should be understood that the present invention is not limited to the exemplary embodiments. For example, the exemplary embodiment of the present invention may be modified in such a way that, when a touch event occurs on the search bar displaying the higher category items and moves in a certain direction, a search bar for searching the lower category items can be displayed.

As described above, the category search method and the mobile device adapted thereto can allow users to rapidly search for a corresponding item, thereby reducing the search time. In addition, exemplary embodiments of the present invention can allow users to easily search for a corresponding item, by successively outputting search bars linked to each other.

As described above, the category search method and the mobile device adapted thereto can rapidly and easily search information categories or menus with a number of depths for a corresponding item based on a simple touch action.

Although it is not shown in the drawings, the mobile device may selectively further include various types of components, for example, a short-range communication module for short-range communication, a camera module for acquiring still images/videos, an interface for transmitting/receiving data in a wireless or wired mode, an Internet communication module, and a digital broadcast module for receiving and reproducing broadcasts. With the spread of digital convergence, although it is impossible to list all the modifications of mobile devices in this description, it will be easily appreciated to those skilled in the art that the other components equivalent to the above-listed components may be further included to the mobile device. In addition, it will be appreciated that the mobile device may be implemented by omitting a particular component or replacing it with other components.

The mobile device may include all information communication devices, multimedia devices, and their applications, which include an earphone interface that various types of jacks for earphones are plugged into and are operated according to communication protocols corresponding to various types of communication systems. For example, the mobile device can be applied to mobile communication terminals, Portable Multimedia Players (PMPs), digital broadcast players, Personal Digital Assistants (PDAs), audio players (e.g., Motion Pictures Expert Group (MPEG-1 or MPEG-2) Audio Layer 3 (MP3) players), mobile game players, smartphones, laptop computers, hand-held PC, and the like.

The terms or words described in the present description and the claims should not be limited by a general or lexical meaning, instead should be analyzed as a meaning and a concept through which the inventor defines and describes the invention at his most effort, to comply with the idea of the invention. Therefore, one skilled in the art will understand that the embodiments disclosed in the description and configurations illustrated in the drawings are only exemplary embodiments of the present invention and there may be various modifications, alterations, and equivalents thereof to replace the described exemplary embodiments at the time of filing this application.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A category search method comprising:
   outputting a first search bar of higher category items, according to a first touch event that occurs on a certain area of a display;
   receiving a drag event occurring from one of the higher category items of the search bar in a direction away from the search bar;
   outputting, if the one of the higher category items comprises at least one lower category item related to the one of the higher category items, a second search bar including the at least one lower category item according to a direction of the drag event;
   outputting, if another drag event occurs successively with the previous drag event on the second search bar and alters the drag direction, a third search bar including lower category items corresponding to an item where the drag direction is altered; and
   scrolling items displayed on the first to third search bars, if touch drag gestures on the first and second search bars are dragged in an output direction of the search bars and moved out of the areas of the search bars, and maintained touch down states at a position of the touch drag gestures,
   wherein the outputting is performed recursively for each drag event from an item comprising a related lower category item.

2. The method of claim 1, wherein the outputting of the first search bar comprises:
   outputting the first search bar at the position of the area where the first touch event of a touch down event occurred.

3. The method of claim 2, wherein the successively outputting of the second search bar comprises:
   successively outputting the second search bar in a direction perpendicular to the output direction of the first search bar.

4. The method of claim 1, further comprising at least one of the following:
   removing the first search bar from the display if the second search bar is output;
   selecting, if a first specific preset event occurs on the second search bar, an item where the first specific preset event occurred, and executing a function corresponding to the selected item;
   removing, if a second specific preset event occurs on the second search bar, all the search bars displayed on the display; and
   removing, if an event corresponding to a specific type of gesture occurs on a certain area of the display, the second search bar that is newly generated.

5. The method of claim 1, wherein:
   the first and second search bars support user functions;
   the user functions comprise at least one of a category, a menu, and a list of items, which are selectable by a user; and
   the category comprises at least one of a menu, a phone number, a name, and an item, which are searchable via the indexes or contents.

6. The method of claim 1, wherein the outputting comprises at least one of the following:
   identifying, if a user function for supporting a search is registered as a category search function, sorted search sorting information associated with the indexes of lower category items linked to each other with a number of depths, and outputting, if the search sorting information exists, the first and second search bars based on the search sorting information;

collecting, if the search sorting information does not exist, indexes for the search function, classifying the indexes to categories with successive depths, transforming the categories to a form of search sorting information that can support a category search function, and outputting at least one of the first and second search bars for supporting the category search function based on the search sorting information; and updating, if an item used for the operation of the user function is deleted or corrected or an item is added, the search sorting information according to the item alteration.

7. The method of claim 1, wherein:
the first and second search bars comprise at least one of images and texts that represent the category items and are arrayed in specific forms; and
the specific forms are areas related to the category items and shaped as one of a polygon, an ellipse, and a circle.

8. The method of claim 1, wherein:
the drag event is successively generated in a continuous touch state of the first touch event.

9. The method of claim 8, wherein:
the touch input of the first touch event and the drag event keep the touch state without losing the contact from a time point that the first touch event occurs to a time point that the drag event is released; and
the drag event that is successively generated in a touch state of the first touch event comprises at least one of:
an event that occurs at a time point when a drag of the first touch event is terminated or the drag gesture exceeds a preset angle;
an event that is not altered during the interval from the time point to a time point that the touch is released; and
an event that occurs when, during the interval from the time point to a time point that the touch is released, at least one of the touch direction exceeds a preset angle and when a specific type of gesture is made.

10. The method of claim 9, wherein the specific type of gesture comprises:
a drag gesture that is made in a shape including at least one of a turning point, a curve, and a straight line.

11. A mobile device with a category search function, the mobile device comprising:
a display for displaying screens according to a search function; and
a processor for controlling the display to output a first search bar of higher category items, according to a first touch event that occurs on a certain area of the display, for receiving a drag event occurring from one of the higher category items of the search bar in a direction away from the search bar, for controlling, if the one of the higher category items comprises at least one lower category item related to the one of the higher category items, the display to output a second search bar including the at least one lower category item according to a direction of the drag event, for controlling, if another drag event occurs successively with the previous drag event on the second search bar and alters the drag direction, the display to output a third search bar including lower category items corresponding to an item where the drag direction is altered, and for scrolling items displayed on the first to third search bars, if touch drag gestures on the first and second search bars are dragged in the output direction of the search bars and moved out of the areas of the search bars, and maintained touch down states at a position of the touch drag gestures,
wherein the controlling of the display to output is performed recursively for each drag event from an item comprising a related lower category item.

12. The mobile device of claim 11, wherein:
the search bars support user functions;
the user functions comprise at least one of a category, a menu, and a list of items, which are selectable by a user; and
the category comprises at least one of a menu, a phone number, a name, an item, which are searchable via the indexes or contents.

13. The mobile device of claim 11, wherein the processor at least one of:
removes a search bar that is output when an event corresponding to a specific type of gesture occurs from the display, and returns to the initial search screen on the second or third search bar when an event corresponding to a specific type of gesture occurs;
selects, if a touch release event occurs on at least one of the first to third search bars, an item where the touch release event occurred and executes a function corresponding to the selected item;
removes, if a new search bar is output, the previously output search bar from the display; and
keeps outputting a newly output search bar on the display and removes the other search bars from the display.

14. The mobile device of claim 11, further comprising:
a memory device for storing search sorting information, sorting the indexes of lower category items linked to higher category items, with a number of depths, in order to support the category search function,
wherein the processor updates, if an item used for the operation of the user function is deleted or corrected or an item is added, the search sorting information according to the item alteration.

15. The mobile device of claim 11, wherein the first and second search bars are shaped as one of a polygon, an ellipse, and a circle where at least one of images and texts that represent the category items are arrayed, and each comprise an area related to the category items.

16. The mobile device of claim 11, wherein:
the drag event is successively generated in a touch state of the first touch event.

17. The mobile device of claim 16,
wherein the touch input of the first touch event and the touch input of the second touch event keep the touch state without losing the contact from a time point that the first touch event occurs to a time point that the second touch event is released,
wherein the drag event comprises at least one of:
an event that occurs at a time point when a drag of the first touch event is terminated or the drag gesture exceeds a preset angle;
an event that is not altered during the interval from the time point to a time point that the touch is released; and
an event that occurs when, during the interval from the time point to a time point that the touch is released, at least one of the touch direction exceeds a preset angle and when a specific type of gesture is made, and wherein the specific type of gesture comprises a drag gesture that is made in a shape including at least one of a turning point, a curve, and a straight line.

* * * * *